US006929547B2

(12) United States Patent  (10) Patent No.: US 6,929,547 B2
Komata  (45) Date of Patent: Aug. 16, 2005

(54) RECORDING MEDIUM, METHOD OF USING A COMPUTER AND COMPUTER FOR EXECUTING ROLE-PLAYING GAMES

(75) Inventor: Nobuhiro Komata, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 53 days.

(21) Appl. No.: 09/757,813

(22) Filed: Jan. 10, 2001

(65) Prior Publication Data
US 2001/0008850 A1 Jul. 19, 2001

(30) Foreign Application Priority Data
Jan. 14, 2000 (JP) ........................................ 2000-040259

(51) Int. Cl.[7] .............................................. A63F 13/00
(52) U.S. Cl. ............................. 463/36; 463/1; 463/38; 463/44
(58) Field of Search .................. 463/36–37, 1, 463/44; 273/148 R, 456, 460, 459; 338/114, 99, 47; 434/236–238

(56) References Cited

U.S. PATENT DOCUMENTS

| 4,445,187 | A | * | 4/1984 | Best | 345/473 |
|---|---|---|---|---|---|
| 5,358,259 | A | * | 10/1994 | Best | 463/31 |
| 5,393,070 | A | * | 2/1995 | Best | 463/35 |
| 5,393,071 | A | * | 2/1995 | Best | 463/1 |
| 5,393,072 | A | * | 2/1995 | Best | 463/1 |
| 5,393,073 | A | * | 2/1995 | Best | 463/35 |
| 5,732,232 | A | | 3/1998 | Brush, II et al. | |
| 5,757,360 | A | * | 5/1998 | Nitta et al. | 345/156 |
| 5,999,084 | A | * | 12/1999 | Armstrong | 200/516 |
| 6,072,467 | A | * | 6/2000 | Walker | 345/157 |
| 6,102,802 | A | * | 8/2000 | Armstrong | 463/37 |
| 6,343,991 | B1 | * | 2/2002 | Armstrong | 463/37 |
| 6,344,791 | B1 | * | 2/2002 | Armstrong | 338/114 |
| 6,351,205 | B1 | * | 2/2002 | Armstrong | 338/114 |

FOREIGN PATENT DOCUMENTS

| EP | 0 847 782 A1 | 6/1998 |
|---|---|---|
| EP | 0 992 927 A1 | 4/2000 |
| JP | 5-87760 | * 11/1993 |
| JP | 11-333139 | 12/1999 |
| TW | 288636 | 10/1996 |

* cited by examiner

Primary Examiner—Jessica Harrison
Assistant Examiner—Alex F. R. P. Rada, II
(74) Attorney, Agent, or Firm—Katten Muchin Rosenman LLP

(57) ABSTRACT

To provide a user interface for exchanges among on-screen characters which is easier-to-use than selecting certain items by a player pushing a simple ON/OFF switch, a computer, a recording medium and a method use a controller which has pressure-sensitive units for sensing a pushing pressure of the player on the controller. The computer is able to execute a game program that includes scenes of exchanges between the player or a character controlled by the player and other characters. The computer also has a unit for generating a pressure-sensing output signal from the pressure-sensitive unit, and a unit for transmitting the emotion of the player corresponding to the pressure-sensing output signal to one of other on-screen characters.

21 Claims, 17 Drawing Sheets

| CHANGE MODE | JOY | ANGER | SADNESS | NORMAL | DECISION |
|---|---|---|---|---|---|
| RAPID "0" → HIGH VALUE | JOY DEPENDING ON THE MAXIMUM VALUE | ANGER DEPENDING ON THE MAXIMUM VALUE | SADNESS DEPENDING ON THE MAXIMUM VALUE | | POSITIVE RESPONSE |
| GRADUAL "0" → ABOVE STIPULATED VALUE | GET UNHAPPY | ANGER SUSIDES | SADNESS IS SOOTHED | MOOD GETS WORSE | POSITIVE RESPONSE |
| GRADUAL "0" → ABOVE STIPULATED VALUE | GET HAPPY A LITTLE AT A TIME | GET ANGRY A LETTLE AT A TIME | GET SAD A LITTLE AT A TIME | MOOD GETS BETTER | NEGATIVE RESPONSE |
| RAPID "0" → STIPULATED VALUE 1 | | | | | POSITIVE RESPONSE |
| RAPID "0" → STIPULATED VALUE 2 | | | | | NEGATIVE RESPONSE |

FIG. 3

RECORDING MEDIUM, METHOD OF USING A COMPUTER AND COMPUTER FOR EXECUTING ROLE-PLAYING GAMES

FIELD OF THE INVENTION

The present invention relates to a recording medium, a method of using a computer and a computer which provides a user interface for exchanges among on-screen characters that is more realistic and easier-to-use than selecting certain items by a user or player pushing a simple ON/OFF switch.

BACKGROUND OF THE INVENTION

Among computer games, specifically in a so-called love simulation game, exchanges between the player and the on-screen characters cause changes in the "emotions" of characters with respect to the player. In addition, in role-playing games, the character controlled by the player has adventures within a game world. In each of these games, these exchanges are typically made between the player and the on-screen characters, or between the character controlled by the player and other on-screen characters.

These exchanges are typically conducted by the method in which the player reads a text and the like, displayed on a monitor as on-screen character messages, and then uses a controller to select either YES or NO or one of a plurality of simple answers in response.

On the other hand, the so-called pressure-sensitive type controllers are used as input devices for electronic equipment represented by computers, and as input devices for entertainment systems represented by game machines, for example. A pressure-sensitive controller is a unit wherein, when pressure is applied with a finger of a user or player directly to a control element connected to a pressure-sensitive device, the pushing pressure is provided as output as a pressure-sensing value. A specific example thereof is, for example, a pressure-sensitive type controller disclosed in the publication of examined Japanese utility model application No. JP-B-H1-40545, wherein pressure-sensitive output is provided as input to a VCO (variable control oscillator) and the output of the VCO is used for repeated fire in a game.

SUMMARY OF THE INVENTION

It is an object of the present invention to provide a user interface for exchanges among characters that is more realistic and easier-to-use than the user's selecting of items by pushing a simple ON/OFF switch.

This and other objects of the present invention are attained by a recording medium on which is recorded a computer-readable and executable software program that includes scenes of exchanges between a player or a character controlled by the player and other characters, and that includes a program that performs processing by taking as instructions an output from a controller which has pressure-sensitive means, wherein said software program comprises a processing program that processes the output of said controller as an emotion or volition of the player.

A method for executing a game program, using a computer that has a controller which has pressure-sensitive means and that is able to execute a game program that includes scenes of exchanges between a player or an on-screen character controlled by the player and other characters, comprises the steps of: generating a pressure-sensing output signal from said pressure-sensitive means, and transmitting an emotion of the player corresponding to said pressure-sensing output signal to at least one of said other characters.

A computer according to the present invention comprises a controller which has pressure-sensitive means and is able to execute a game program that includes scenes of exchanges between the player or an on-screen character controlled by the player and other characters; means for generating a pressure-sensing output signal from said pressure-sensitive means; and for means transmitting an emotion of the player corresponding to said pressure-sensing output signal to at least one of said other characters.

BRIEF DESCRIPTION OF THE DRAWINGS

FIG. 3 is a table for selecting the degree of emotion or volition to be transmitted;

DETAILED DESCRIPTION OF THE PREFERRED EMBODIMENTS

Here follows a detailed description of the recording medium, method of using a computer and a computer according to the present invention, made with reference to the appended drawings. It should be noted that in the figures, identical elements are given the same symbols and redundant explanation is omitted.

In a controller that uses a pressure-sensitive device, when the button which is the control element is pushed, not only is the presence of pressure-sensing output detected, for example, as the ON/OFF of a switch, but also pressure-sensing value output which depends on the pushing pressure of a player is also obtained. On the other hand, in software or games that use pressure-sensing value output, various processing or actions can be entered depending on the pressure-sensing value output. In this embodiment, even when emotion or volition is transmitted by operating a control element, it is possible to change the degree of emotion or volition depending on the pressure-sensing values based on the pushing operation of various control elements by the player.

In the present embodiment, in the so-called love simulation games or other software wherein the emotions of the user change depending on the progress of the game or the like, the emotion or volition of the player himself/herself is output depending on the pressure-sense values or the pattern of changes therein output when a controller which has a pressure-sensitive device is operated. Thereby, it is intended to provide a system with a user interface that is improved compared to the transmission of the emotion or volition of the player himself/herself by means of a simple selection.

Figure 1:
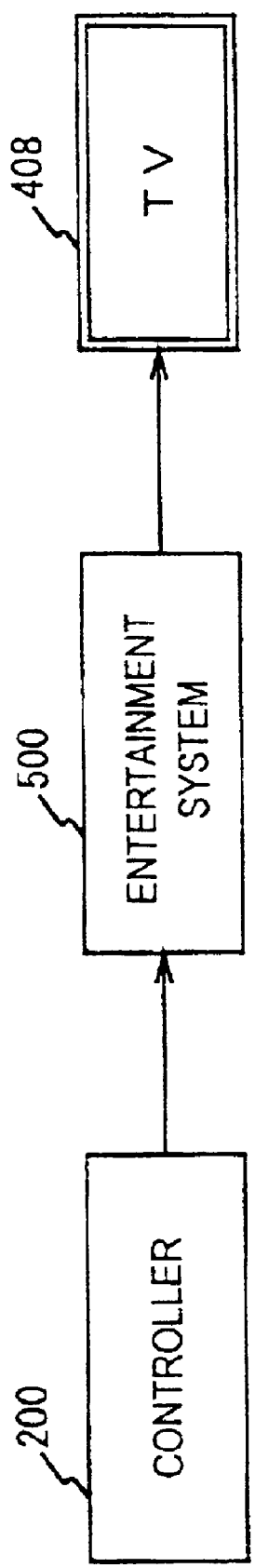
FIG. 1 is a diagram showing connection of a controller to an entertainment system.
Figure 5:
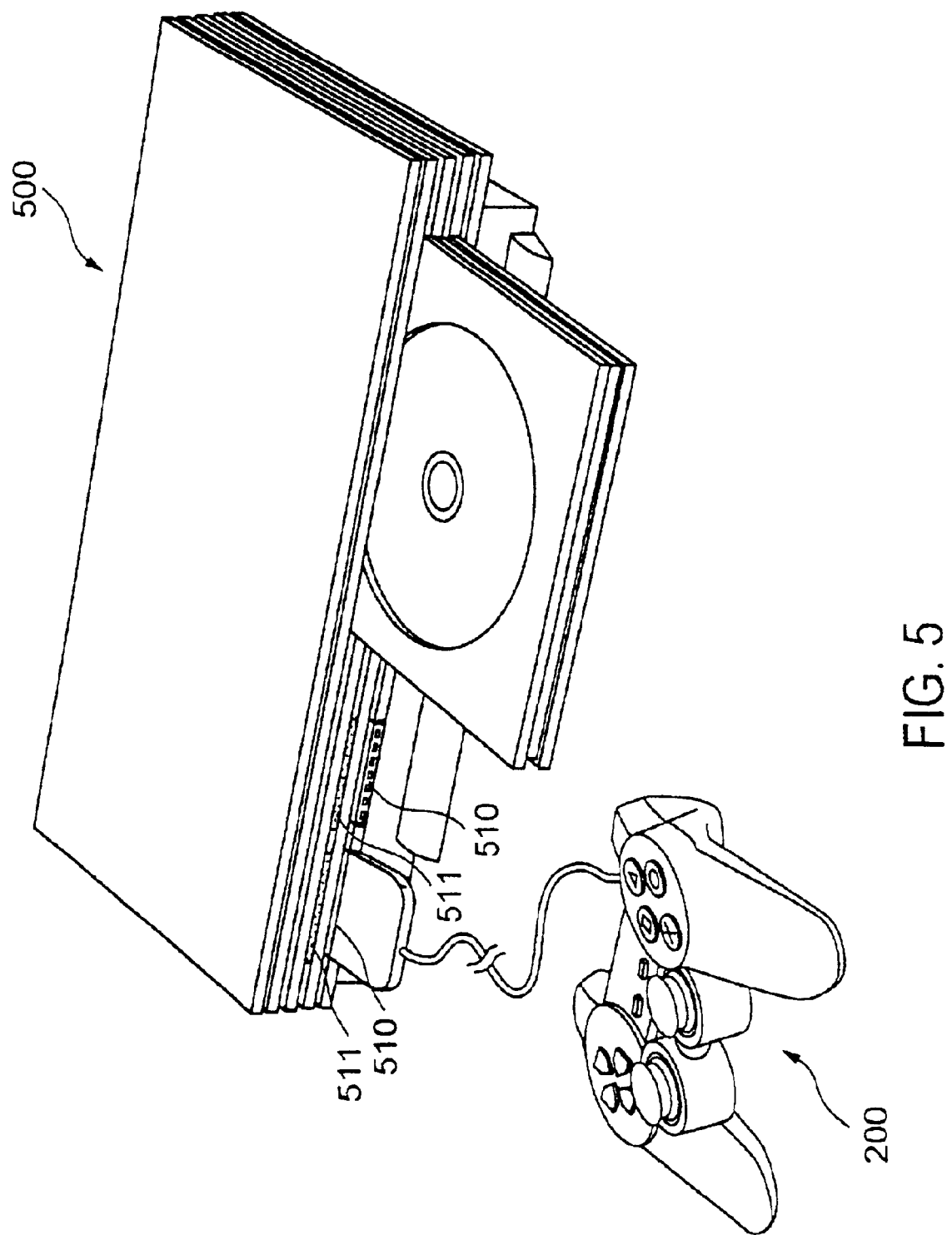
FIG. 5 is a perspective view showing the controller connected to the entertainment system.

FIG. 1 shows connection of a controller to an entertainment system to enable a player to enjoy game software or video. More specific structures are shown in FIG. 5 and other figures of the drawings.

As shown in this FIG. 1, a controller 200 which has buttons connected to pressure-sensitive devices is connected to an entertainment system 500 used for playing games or enjoying DVD video or other types of video images, and the video output terminals are connected to a television monitor 408. Here, the analog output from the pressure-sensitive devices is converted by an A/D converter to digital values in the range 0–255 and provided to the entertainment system 500.

Figure 2:
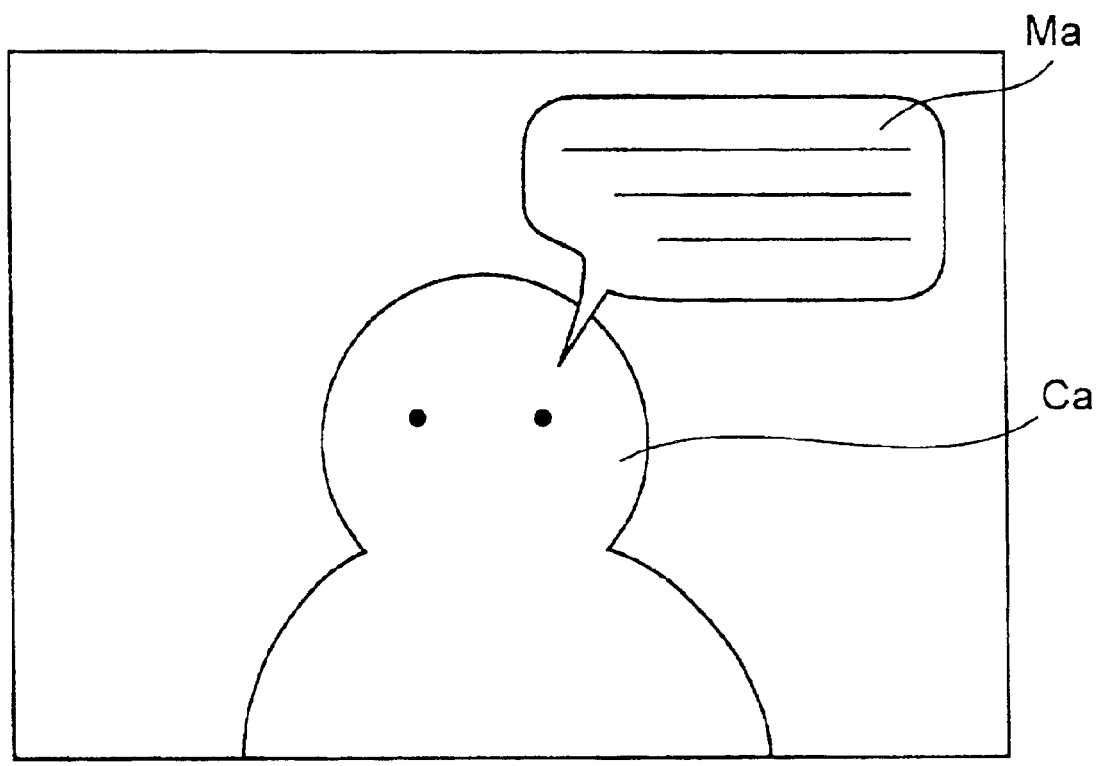
FIG. 2 is a diagram showing an example of a screen display in a love simulation game.
Figure 4:
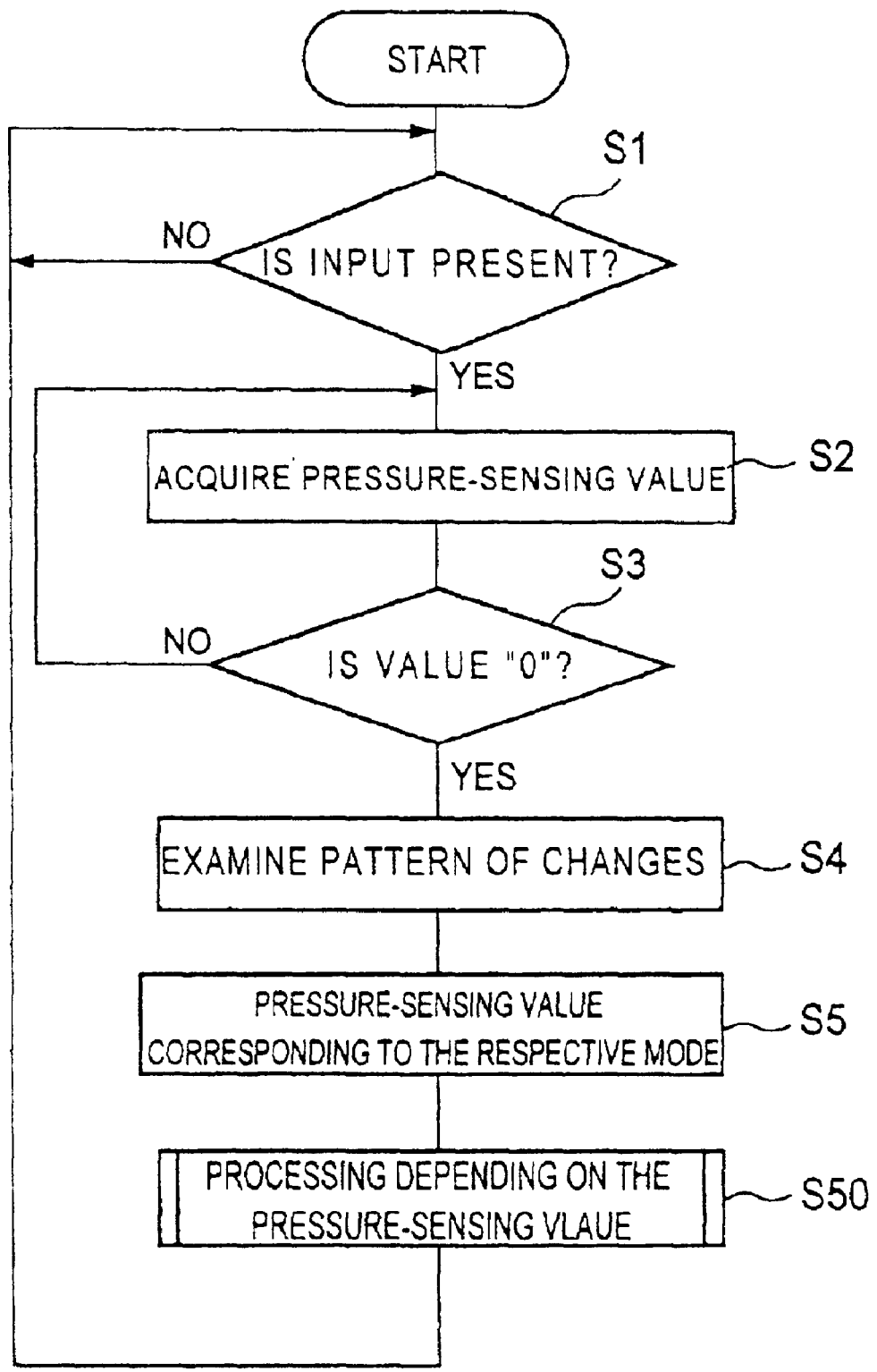
FIG. 4 is a flowchart of processing of a love simulation game which includes a program for transmitting emotion or volition depending on pressure-sensing values.

With reference to FIGS. 2–4, here follows a description of the case wherein the player's emotion or volition is transmitted depending on the operation of the controller 200. FIG. 2 shows an example of a screen display in a love simulation game. Normally, virtual friendship is simulated through conversations with another character Ca controlled by the CPU of the entertainment system 500, by means of the display of messages Ma from the other character Ca and the selection of one of several responses as the volition of the user to be transmitted to the other character Ca.

In previous love simulation games, when one of a number of choices displayed on the screen is selected, the meaning indicated by the selected text is transmitted to the other character Ca as the volition of the player, and then the other character Ca reacts based thereupon, thereby simulating a relationship with the player.

At the time that the player transmits his/her own volition to the other character, it was only possible to select one of several predetermined choices by pushing a button or the like.

In the present embodiment, the magnitude of the pressure-sensing values from a pressure-sensitive controller or the changes therein are transmitted to the other character as emotion or volition of the player.

FIG. 3 shows an example of a table for selecting the degree of emotion or volition to be transmitted by the player to the other character Ca (shown in FIG. 2) depending on the pattern of change in the pressure-sensing value of a pushing pressure of the player on the control element and the scene.

In this example, the modes in various scenes, namely a mode in which there is a high probability of expressing joy, a mode in which there is a high probability of expressing anger, a mode in which there is a high probability of expressing sadness, normal mode, and a mode in which the player is asked to make a decision:

(1) a pattern of changing rapidly from 0 to a high value and then rapidly returning to 0, (2) a pattern of changing gradually to above a stipulated value and then gradually returning to 0, (3) a pattern of changing gradually to above a stipulated value and then rapidly returning to 0, (4) a pattern of changing rapidly from 0 to stipulated value 1 and then rapidly returning to 0, and (5) a pattern of changing rapidly from 0 to stipulated value 2 and then rapidly returning to 0, may each express the strength of the corresponding emotion or volition, or a negative or positive response.

Here, the "stipulated value" may refer to the median value of 128 among the pressure-sensing values of 0–255 when the pressure-sensing values are divided into 256 steps. The "stipulated value 1" may be selected to be 100, for example, while the "stipulated value 2" may be selected to be 200, for example. These values may be selected appropriately at the time of writing of the software by performing actual operation or the like.

In addition, "rapidly" may be defined to be the case wherein several pressure-sensing values are obtained from after above the stipulated value until 0 is reached, or when virtually none are obtained. In contrast, "gradually" may be defined to be all other cases, namely the case wherein several dozen pressure-sensing values or more than a hundred are obtained from after above the stipulated value until 0 is reached or from 0 to above the stipulated value. These criteria must also be set in consideration of the characteristics of the pressure-sensitive device, the characteristics of the operating mechanism and the like.

In addition, as shown in FIG. 3, the emotion and volition in the various modes consists of: in a mode wherein joy is expected or in a joyous scene, "Joy depending on the maximum value," "Get unhappy" or "Get happy a little at a time"; in a mode wherein anger is expected or in an angry scene, "Anger depending on the maximum value," "Anger subsides" or "Get angry a little at a time"; in a mode wherein sadness is expected or in a sad scene, "Sadness depending on the maximum value," "Sadness is soothed" or "Get sad a little at a time"; in a normal mode, "Mood gets worse" or "Mood gets better"; or in a decision mode, for example, in a mode wherein permission from a character is requested or the like, a "Positive response" or a "Negative response" is prepared for each, respectively. These emotions and volition may take the following values, for example:

"Joy depending on the maximum value": the maximum value among the pressure-sense values is used.

"Get unhappy": the pressure-sense value as the stipulated value is used, and next a value found by sequentially subtracting the stipulated value from this pressure-sense value is used for a stipulated period of time.

"Get happy a little at a time": a value found by starting at 0 and adding a stipulated value at a time is used for a stipulated period of time.

"Anger depending on the maximum value": the maximum value among the pressure-sense values is used.

"Anger subsides": the pressure-sensing value as the stipulated value is used, and next a value found by sequentially subtracting the stipulated value from this pressure-sensing value is used for a stipulated period of time.

"Get angry a little at a time": a value found by starting at 0 and adding a stipulated value at a time is used for a stipulated period of time.

"Sadness depending on the maximum value": the maximum value among the pressure-sensing values is used.

"Sadness is soothed": the pressure-sensing value as the stipulated value is used, and next a value found by sequentially subtracting the stipulated value from this pressure-sensing value is used for a stipulated period of time.

"Get sad a little at a time": a value found by starting at 0 and adding a stipulated value at a time is used for a stipulated period of time.

"Mood gets worse": the pressure-sensing value as the stipulated value is used, and next a value found by sequentially subtracting the stipulated value from this pressure-sensing value is used for a stipulated period of time.

"Mood gets better": a value found by starting at 0 and adding a stipulated value at a time is used for a stipulated period of time.

"Positive response": a value 1 which indicates a positive response is used.

"Negative response": a value 0 which indicates a positive response is used.

Note that the usage in software may be, for example, in an anger mode, when anger depending on the maximum value is transmitted as a value, in response, the character may become scared or hide or take other actions. Or when get angry a little at a time is transmitted as a value, in response, the character may gradually begin to cry, or the like.

Next, in reference to FIG. 4, we shall describe a love simulation game wherein emotion or volition can be transmitted depending on the pattern of changes in the pressure-sensing value.

The flowchart shown in FIG. 4 shows the processing of a love simulation game that includes a program for transmitting emotion or volition depending on pressure-sensing values.

In FIG. 4, in Step S1, a decision is made as to whether or not input is present and if "YES" then control processing moves to Step S2.

In Step S2, the pressure-sensing value is acquired from the controller 200, and in Step S3 a decision is made as to whether or not the acquired pressure-sense value is 0 and if "YES" then control processing moves to Step S4, but if "NO" then control processing moves back to Step S2.

The reason why the decision of whether or not the value is 0 is made in Step S3 is so that, in the case that input is made when there is no input, this becomes a pattern that is always "0" "input value" "0". Naturally, it need not be said that a plurality of input values will be acquired when the pressure-sensitive button is pressed with constant force for a fixed length of time.

In Step S4, the pattern of changes is examined. The table shown in FIG. 3 is consulted to identify the pattern of changes. In Step S5, a value indicating emotion or volition corresponding to the respective mode is selected. These values are set at the time of software design to be convenient.

In Step S5, the game proceeds depending on the aforementioned value of emotion or volition.

As described above, in this embodiment, emotion or volition is transmitted depending on the pressure-sensing value, or in other words, here the degree of emotion or volition depending on the pattern of changes of the pressure-sensing value, so it is possible to heighten game play and improve the user interface of love simulation games wherein volition is transmitted by selecting items through pushing buttons.

It is to be noted that the aforementioned example describes an example of applying the transmission of emotion or volition depending on pressure-sensing values to a love simulation game, but it need not be said that it is also applicable to any type of game that requires the transmission of the emotion or volition of the user including role-playing games, for example.

In the case of application to a role-playing game, rather than the emotion or volition of the player himself/herself, naturally the emotion or volition of the player character controlled by the player is reflected in the game.

Moreover, this embodiment describes the case of transmitting changes in the pressure-sensing values as will or volition depending on previously predicted modes, but rather, the aforementioned modes may be allocated to all of the buttons, so it is possible to transmit emotion or volition in that mode when the various buttons are pressed.

Moreover, it is also sufficient for one mode button to be used to switch the mode manually.

FIG. 5 is a perspective view showing the controller 200 connected to entertainment system 500. The controller 200 is removably connected to the entertainment system 500, and the entertainment system 500 is connected to television monitor 408.

The entertainment system 500 reads the program for a computer game from recording media upon which that program is recorded and by executing the program, displays characters on the television monitor 408. The entertainment system 500 has also various built-in functions for DVD (Digital Versatile Disc) playback, CDDA (compact disc digital audio) playback and the like. The signals from the controller 200 are also processed as one of the aforementioned control functions within the entertainment system 500, and the content thereof may be reflected in the movement of characters and the like, on the television monitor 408.

While this depends also on the content of the computer game program, controller 200 may be allocated functions for moving the characters displayed on the television monitor 408 in the directions up, down, left or right.

Figure 6:
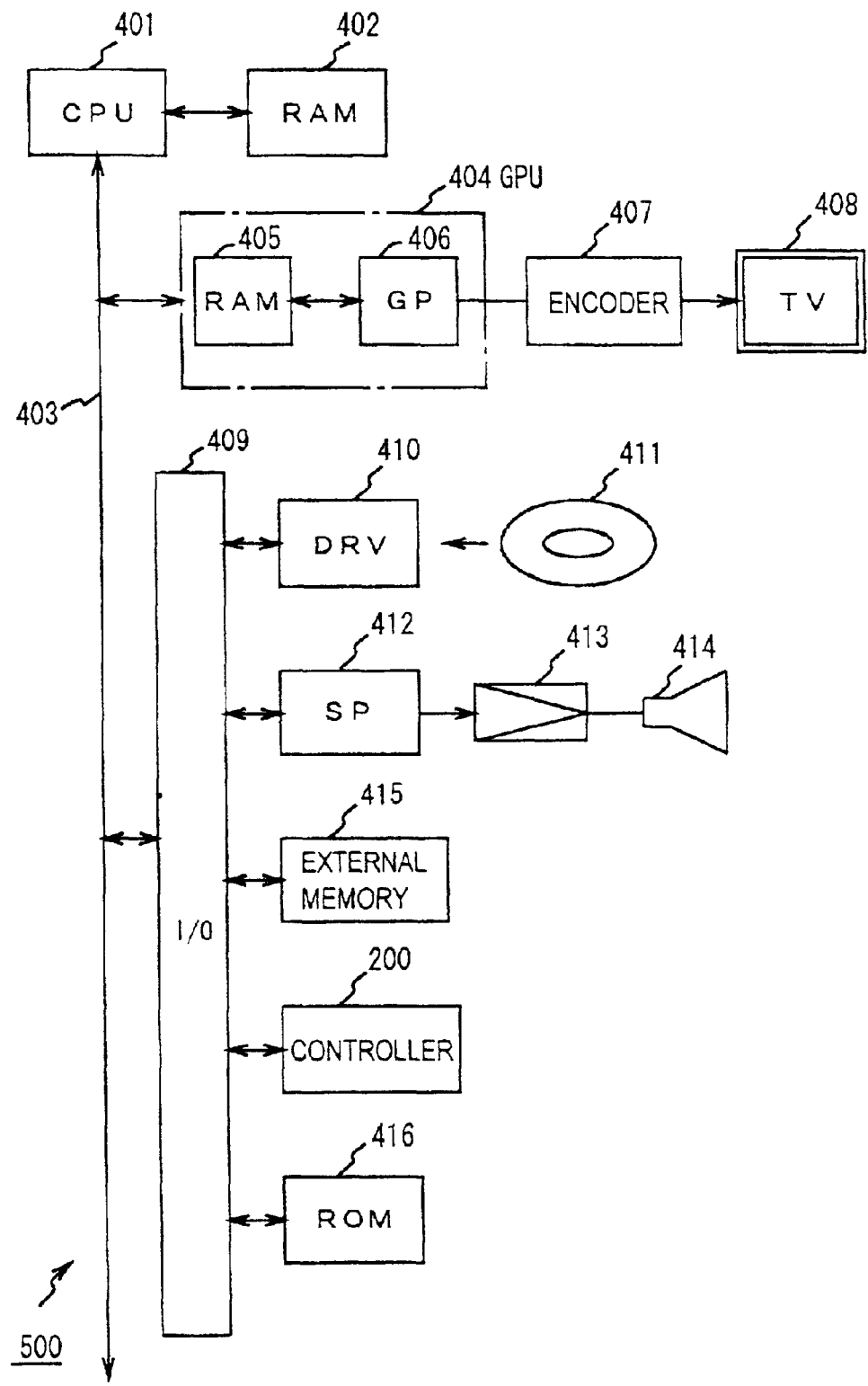
FIG. 6 is a block diagram of the entertainment system.

With reference to FIG. 6, here follows a description of the interior of the entertainment system 500 shown in FIG. 5. FIG. 6 is a block diagram of the entertainment system 500.

A CPU 401 is connected to RAM 402 and a bus 403, respectively. Connected to bus 403 are a graphics processor unit (GPU) 404 and an input/out processor (I/O) 409, respectively. The GPU 404 is connected via an encoder 407 for converting a digital RGB signal or the like into the NTSC standard television format, for example, to a television monitor (TV) 408 as a peripheral.

Connected to the I/O 409 are a driver (DRV) 410 used for the playback and decoding of data recorded upon an optical disc 411, a sound processor (SP) 412, an external memory 415 consisting of flash memory, controller 200 and a ROM 416 which records the operating system and the like. The SP 412 is connected via an amplifier 413 to a speaker 414 as a peripheral.

Here, the external memory 415 may be a card-type memory consisting of a CPU or a gate array and flash memory, which is removably connected via a connector 511 to the entertainment system 500 shown in FIG. 5. The controller 200 is configured such that, when a plurality of buttons provided thereupon are pushed by a user, it gives instructions to the entertainment system 500. In addition, the driver 410 is provided with a decoder for decoding images encoded based upon the MPEG standard.

The description will be made now as to how the images will be displayed on the television monitor 408 based on the operation of controller 200. It is assumed that data for objects consisting of polygon vertex data, texture data and the like recorded on the optical disc 411 is read by the driver 410 and stored in the RAM 402 of the CPU 401.

When instructions from the player via controller 200 are provided as an input to the entertainment system 500, the CPU 401 calculates the three-dimensional position and orientation of objects with respect to the point of view based on these instructions. Thereby, the polygon vertex data for objects defined by X, Y, Z coordinate values are modified variously. The modified polygon vertex data is subjected to perspective conversion processing and converted into two-dimensional coordinate data.

The regions specified by two-dimensional coordinates are so-called polygons. The converted coordinate data, Z data and texture data are supplied to the GPU 404. Based on this converted coordinate data, Z data and texture data, the GPU 404 performs the drawing process by writing texture data sequentially into the RAM 405. One frame of image data upon which the drawing process is completed, is encoded by the encoder 407 and then supplied to the television monitor 408 and displayed on its screen as an image.

Figure 7:
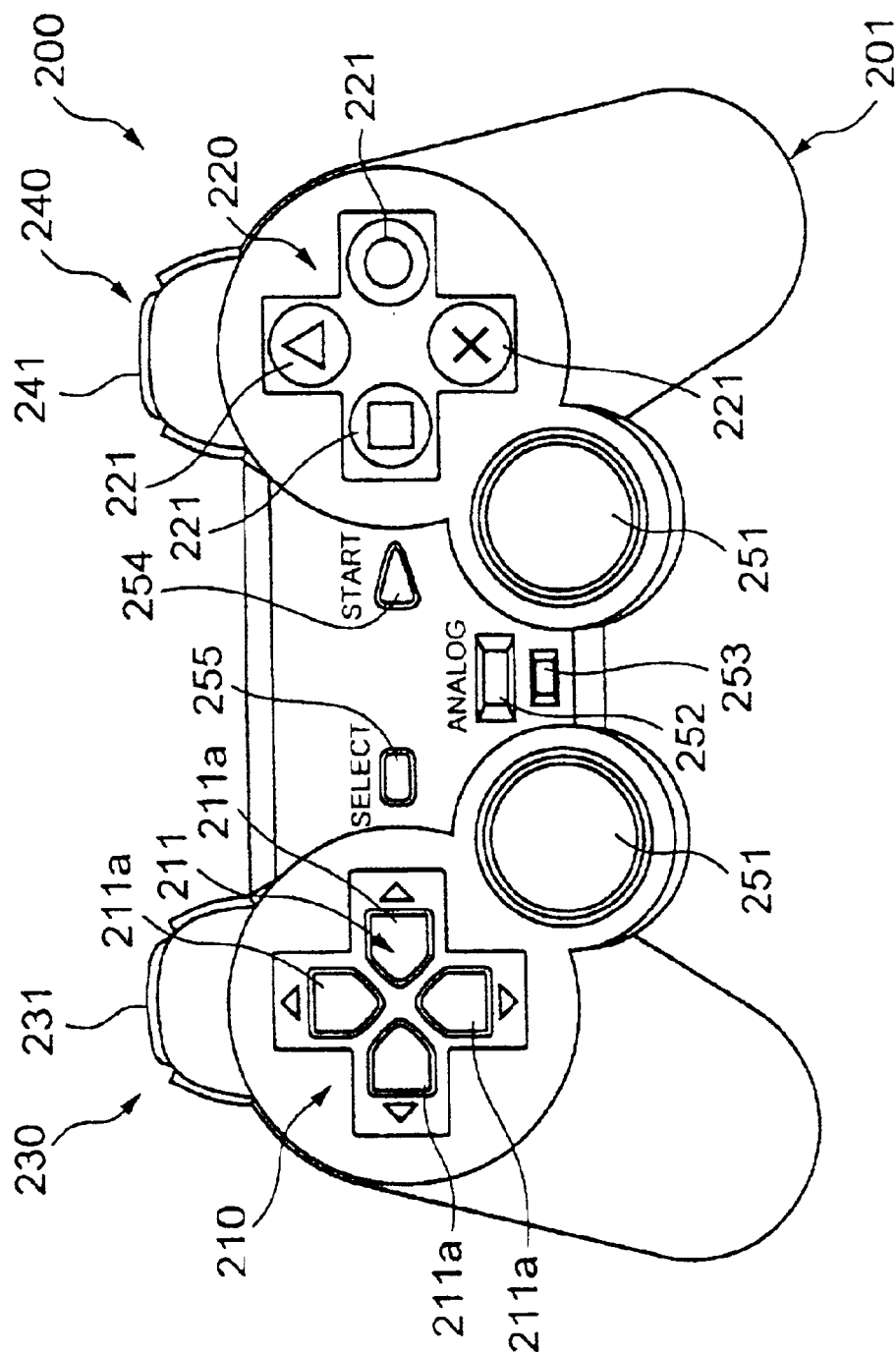
FIG. 7 is a top plan view of the controller.

FIG. 7 is a top view of controller 200. The controller 200 includes a unit body 201 on the top surface of which are provided first and second control parts 210 and 220, and on the side surface of which are provided third and fourth control parts 230 and 240 of the controller 200.

The first control part 210 of the controller is provided with a cruciform control unit 211 used for pushing control, and the individual control keys 211*a* extending in each of the four directions of the control unit 211 form a control element. The first control part 210 is the control part for providing movement to the characters displayed on the screen of the television receiver, and has the functions for moving the characters in the up, down, left and right directions by pressing the individual control keys 211*a* of the cruciform control unit 211.

The second control part 220 is provided with four cylindrical control buttons 221 (control elements) for pushing control. The individual control buttons 221 have identifying marks such as "○" (circle), "X" (cross), "Δ" (triangle) and "□" (quadrangle) on their tops, in order to easily identify the individual control buttons 221. The functions of the second control part 220 are set by the game program recorded upon the optical disc 411, and the individual control buttons 221 may be allocated functions that change the state of the game characters, for example. For example, the control buttons 221 may be allocated functions for moving the left arm, right arm, left leg and right leg of the character on the screen.

The third and fourth control parts 230 and 240 of the controller have nearly the same structure, and both are provided with two control buttons 231 and 241 (control elements) for pushing control, arranged above and below. The functions of these third and fourth control parts 230 and 240 are also set by the game program recorded upon the optical disc, and may be allocated functions for making the game characters do special actions, for example.

Moreover, two joy sticks 251 for performing analog operation are provided upon the unit body 201 shown in FIG. 7, The joy sticks 251 can be switched and used instead of the first and second control parts 210 and 220 described above. This switching is performed by means of an analog selection switch 252 provided upon the unit body 201. When the joy sticks 251 are selected, a display lamp 253 provided on the unit body 201 lights, indicating the state wherein the joy sticks 251 are selected. It is to be noted that on unit body 201 there are also provided a start switch 254 for starting the game and a select switch 255 for selecting the degree of difficulty or the like at the start of a game, and the like.

Controller 200 is held by the left hand and the right hand of a user and is operated by the other fingers of the user, and in particular the user's thumbs are able to operate most of the buttons on the top surface.

Figure 8:
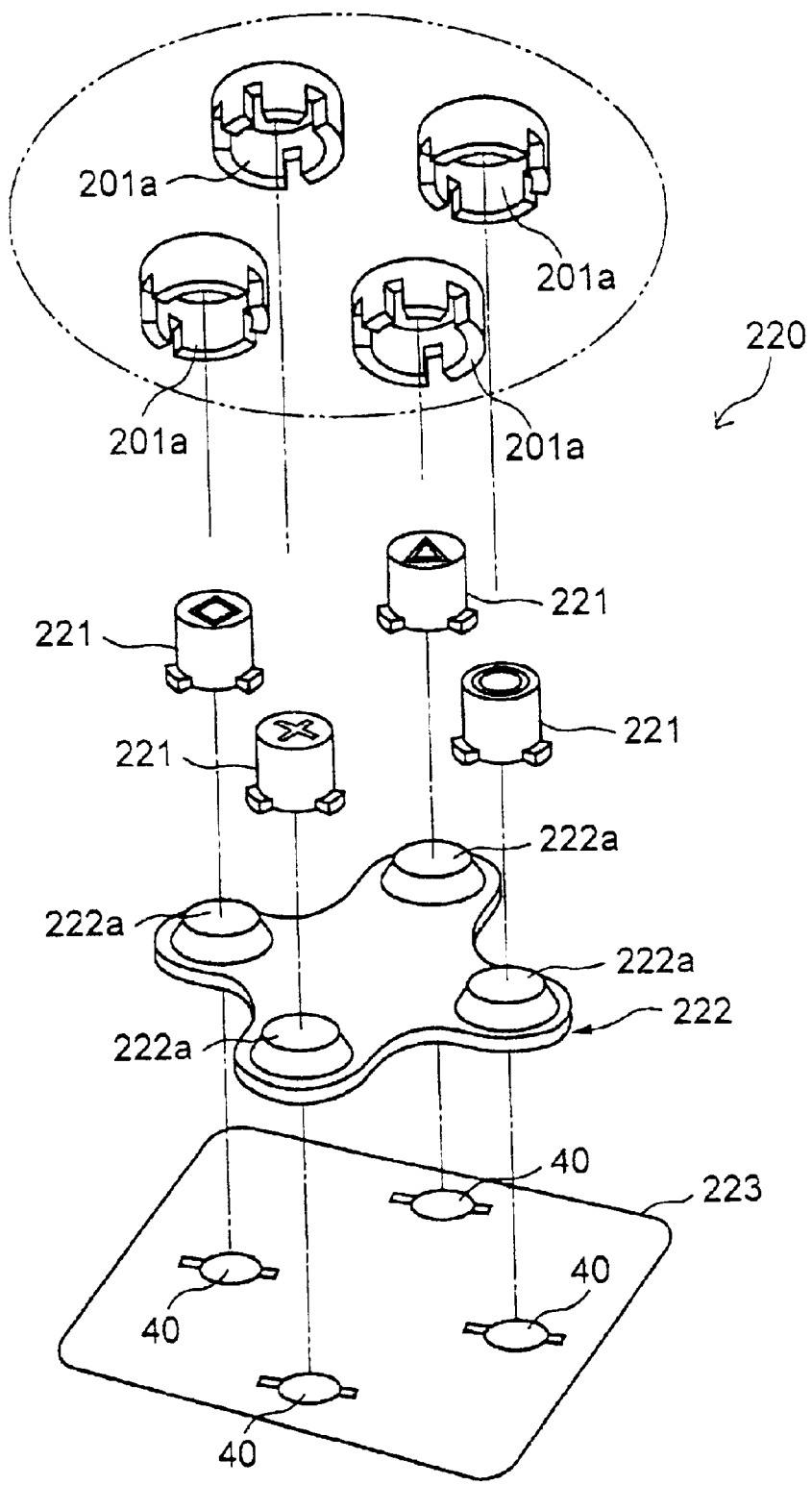
FIG. 8 is an exploded perspective view of an embodiment of the second control part of the controller.

FIG. 8 and FIGS. 9A–9C are, respectively, an exploded perspective view and cross-sectional views showing the second control part of the controller. As shown in FIG. 8, the second control part 220 consists of four control buttons 221 which serve as the control elements, an elastic body 222, and a sheet member 223 provided with resistors 40. The individual control buttons 221 are inserted from behind through insertion holes 201*a* formed on the upper surface of the unit body 201. The control buttons 221 inserted into the insertion holes 201*a* are able to move freely in the axial direction.

Figure 9A:
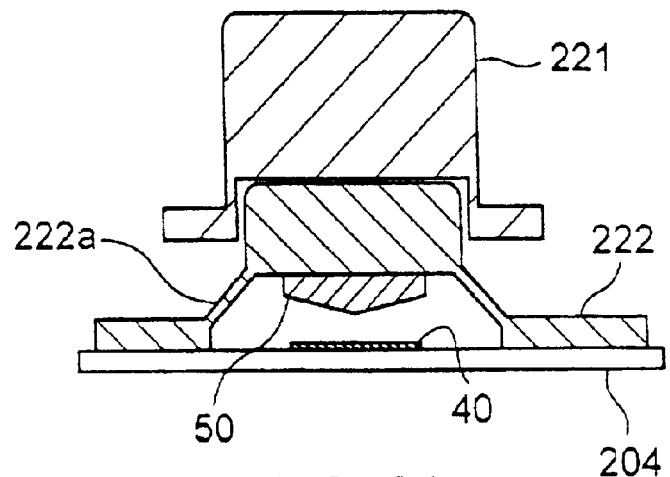
FIGS. 9A–9C cross-sectional views of the second control part of the controller of FIG. 8.
Figure 9B:
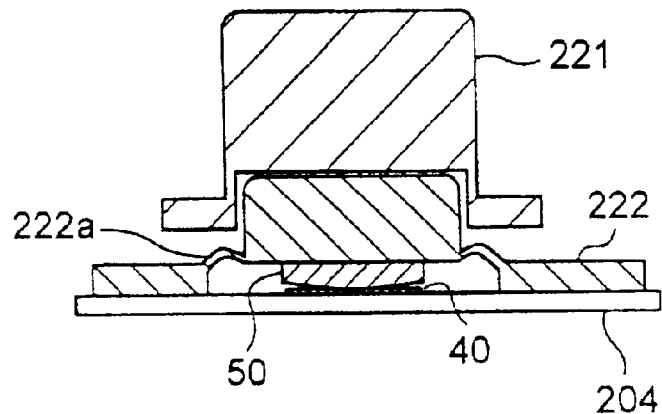
Figure 9C:
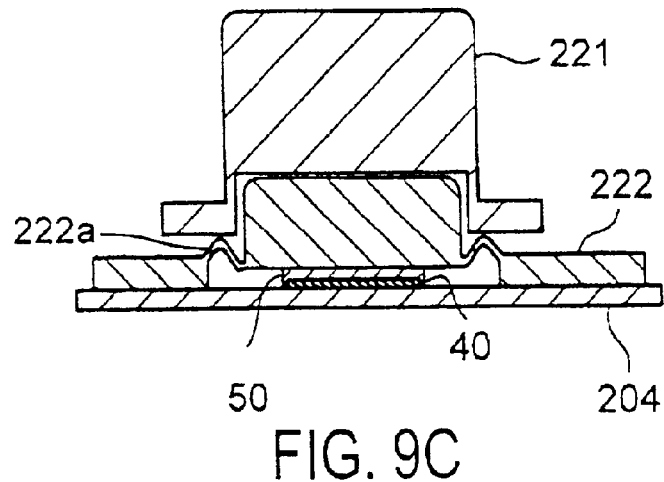

The elastic body 222 is made of insulating rubber or the like and has elastic areas 222*a* which protrude upward, and the lower ends of the control buttons 221 are supported upon the upper walls of the elastic areas 222*a*. When the control buttons 221 are pressed, the inclined-surface portions of these elastic areas 222*a* flex so that the upper walls move together with the control buttons 221. On the other hand, when the pushing pressure on the control buttons 221 is released, the flexed inclined-surface portions of elastic areas 222*a* elastically return to their original shape, pushing up the control buttons 221. The elastic body 222 functions as a spring means whereby control buttons 221 which had been pushed in by a pushing action are returned to their original positions. As shown in FIGS. 9A–9C, conducting members 50 are attached to the rear surface of the elastic body 222.

The sheet member 223 consists of a membrane or other thin sheet material which has flexibility and insulating properties. Resistors 40 are provided in appropriate locations on this sheet member 223 and these resistors 40 and conducting member 50 are each disposed such that they face one of the control buttons 221 via the elastic body 222. The resistors 40 and conducting members 50 form pressure-sensitive devices. These pressure-sensitive devices consisting of resistors 40 and conducting members 50 have resistance values that vary depending on the pushing pressure received from the control buttons 221.

To describe this in more detail, as shown in FIGS. 9A–9C the second control part 220 is provided with control buttons 221 as control elements, an elastic body 222, conducting member 50 and resistors 40. Each conducting member 50 may be made of conductive rubber which has elasticity, for example, and has a conical shape with its center as a vertex. The conducting member 50 are adhered to the inside of the top surface of the elastic areas 222*a* formed in the elastic body 222.

In addition, the resistors 40 may be provided on an internal board 204, for example, opposite the conducting members 50, so that the conducting members 50 come into contact with resistors 40 together with the pushing action of the control buttons 221. The conducting member 50 deforms, depending on the pushing force on the control button 221 (namely the contact pressure with the resistor 40), so as shown in FIGS. 9B and 9C, the surface area in contact with the resistor 40 varies depending on the pressure. To wit, when the pressing force on the control button 221 is weak, as shown in FIG. 8B, only the area near the conical tip of the conducting member 50 is in contact. As the pressing force on the control button 221 becomes stronger, the tip of the conducting member 50 deforms gradually so the surface area in contact expands.

Figure 10:
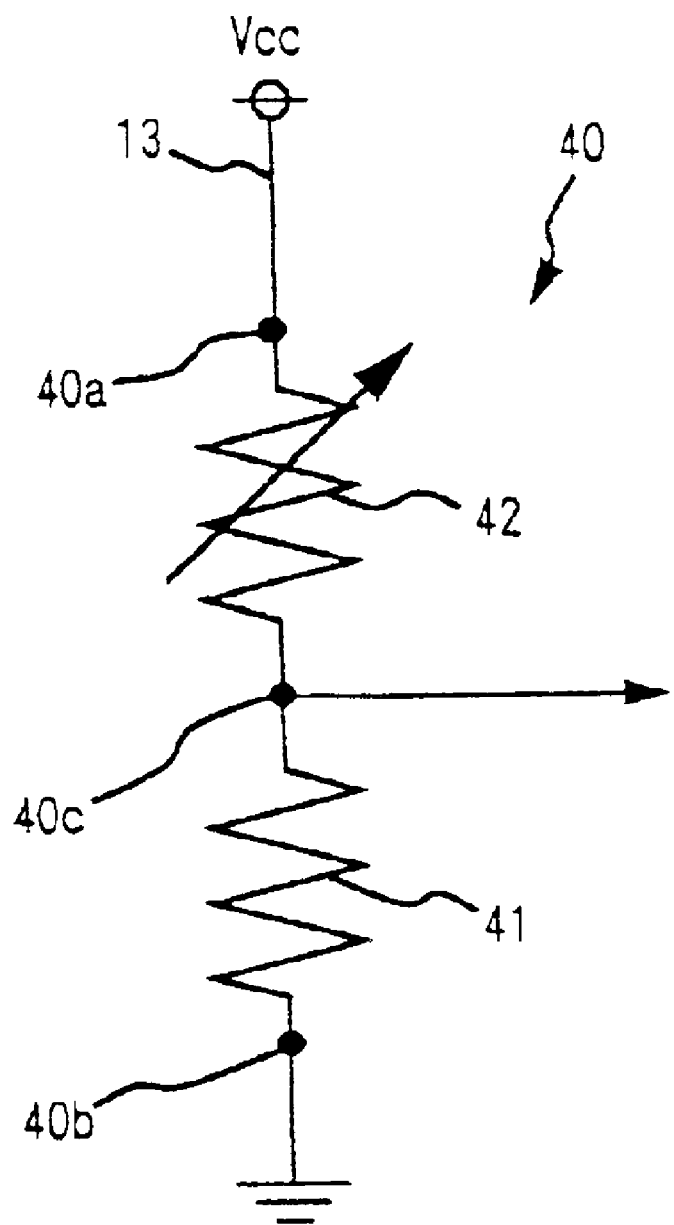
FIG. 10 is a diagram showing an equivalent circuit for a pressure-sensitive device.

FIG. 10 is a diagram showing an equivalent circuit for a pressure-sensitive device consisting of a resistor 40 and conducting member 50. As shown in this diagram, the pressure-sensitive device is inserted in series in a power supply line 13, where the voltage $V_{cc}$ is applied between the electrodes 40*a* and 40*b*. As shown in this diagram, the pressure-sensitive device is divided into a variable resistor 42 that has the relatively small resistance value of the conducting member 50, and a fixed resistor 41 that has the relatively large resistance value of the resistor 40. Among these, the portion of the variable resistor 42 is equivalent to the portion of resistance in the contact between the resistor 40 and the conducting member 50, so the resistance value of the pressure-sensitive device varies depending on the surface area of contact with the conducting member 50.

When the conducting member 50 comes into contact with the resistor 40, in the portion of contact, the conducting member 50 becomes a bridge instead of the resistor 40 and a current flows, so the resistance value becomes smaller in the portion of contact. Therefore, the greater the surface area of contact between the resistor 40 and conducting member 50, the lower the resistance value of the pressure-sensitive device becomes, In this manner, the entire pressure-sensitive device can be understood to be a variable resistor. It should be noted that FIGS. 9A–9C show only the contact portion between the conducting member 50 and resistor 40 which forms the variable resistor 42 of FIG. 10 but the fixed resistor of FIG. 10 is omitted from FIGS. 9A–9C.

In the preferred embodiment, an output terminal is provided near the boundary between the variable resistor 42 and fixed resistor 41, namely near the intermediate point of the resistors 40, and thus a voltage stepped down from the applied voltage $V_{cc}$ by the amount the variable resistance is extracted as an analog signal corresponding to the pushing pressure by the user on the control button 221.

First, since a voltage is applied to the resistor 40 when the power is turned on, even if the control button 221 is not pressed, a fixed analog signal (voltage) $V_{min}$ is provided as the output from the output terminal 40c. Next, even if the control button 221 is pressed, the resistance value of this resistor 40 does not change until the conducting member 50 contacts the resistor 40, so the output from the resistor 40 remains unchanged at $V_{min}$. If the control button 221 is pushed further and the conducting member 50 comes into contact with the resistor 40, the surface area of contact between the conducting member 50 and the resistor 40 increases in response to the pushing pressure on the control button 221, and thus the resistance of the resistor 40 is reduced so the analog signal (voltage) output from the output terminal 40c of the resistor 40 increases. Furthermore, the analog signal (voltage) output from the output terminal 40c of the resistor 40 reaches the maximum $V_{max}$ when the conducting member 50 is most deformed.

Figure 11:
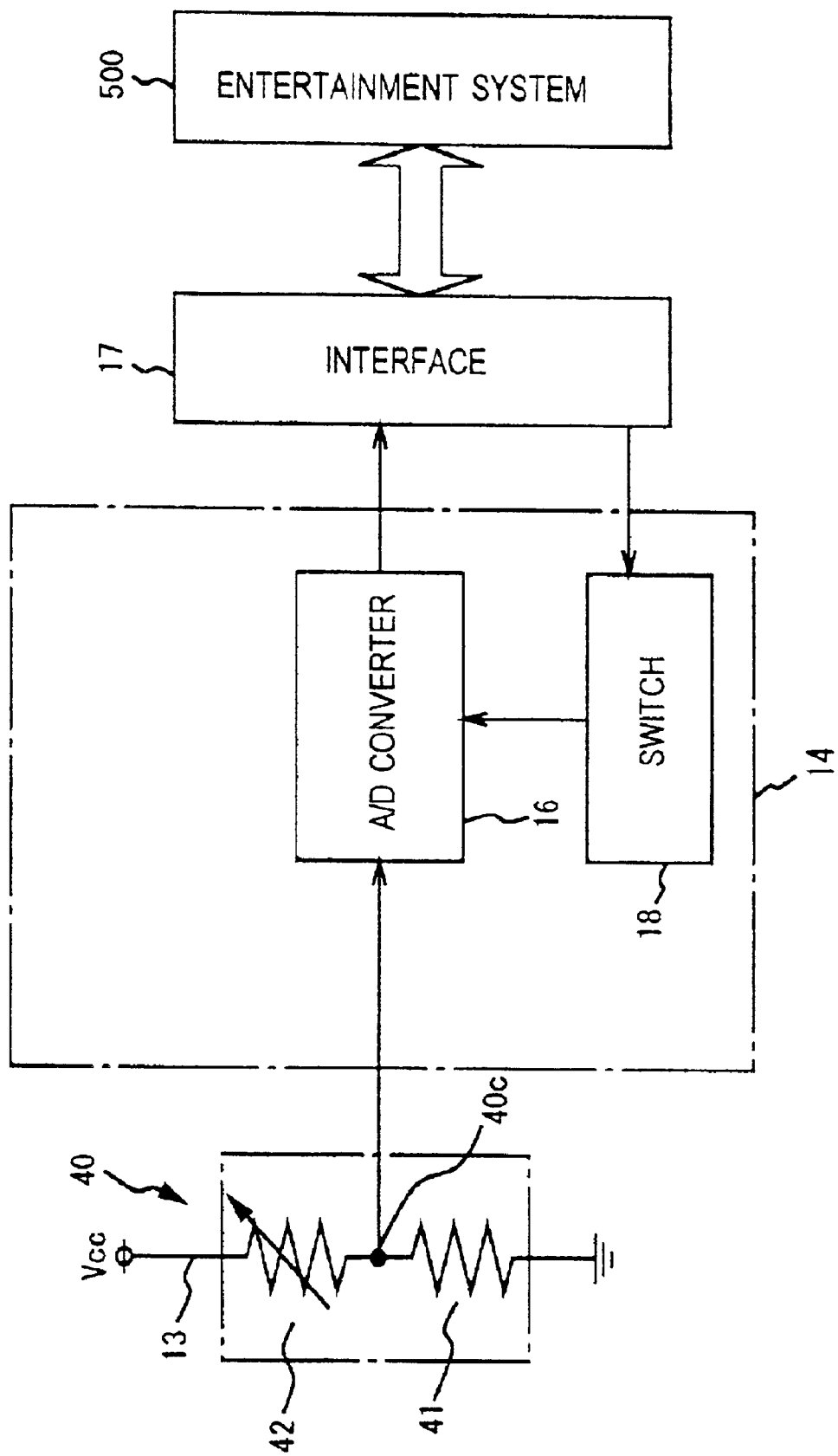
FIG. 11 is a block diagram of the main parts of the controller.

FIG. 11 is a block diagram of the main parts of the controller 200.

An MPU 14 mounted on the internal board of the controller 200 is provided with a switch 18 and an A/D converter 16. The analog signal (voltage) output from the output terminal 40c of the resistor 40 is provided as the input to the A/D converter 16 and is converted to a digital signal.

The digital signal output from the A/D converter 16 is sent via an interface 17 provided upon the internal board of the controller 200 to the entertainment system 500 and the actions of game characters and the like are executed based on this digital signal.

Changes in the level of the analog signal output from the output terminal 40c of the resistor 40 correspond to changes in the pushing pressure received from the control button 221 (control element) as described above. Therefore, the digital signal outputted from the A/D converter 16 corresponds to the pushing pressure on the control button 221 (control element) from the user. If the actions of the game characters and the like are controlled based on the digital signal that has such a relationship with the pushing pressure from the user, it is possible to achieve smoother and more analog-like action than with control based on a binary digital signal based only on zeros and ones.

The configuration is such that the switch 18 is controlled by a control signal sent from the entertainment system 500 based on a game program recorded on an optical disc 411. When a game program recorded on optical disc is executed by the entertainment system 500, depending on the content of the game program, a control signal is provided as output to specify whether the A/D converter 16 is to function as a means of providing output of a multi-valued analog signal, or as a means of providing a binary digital signal. Based on this control signal, the switch 18 is switched to select the function of the A/D converter 16.

Figure 12:
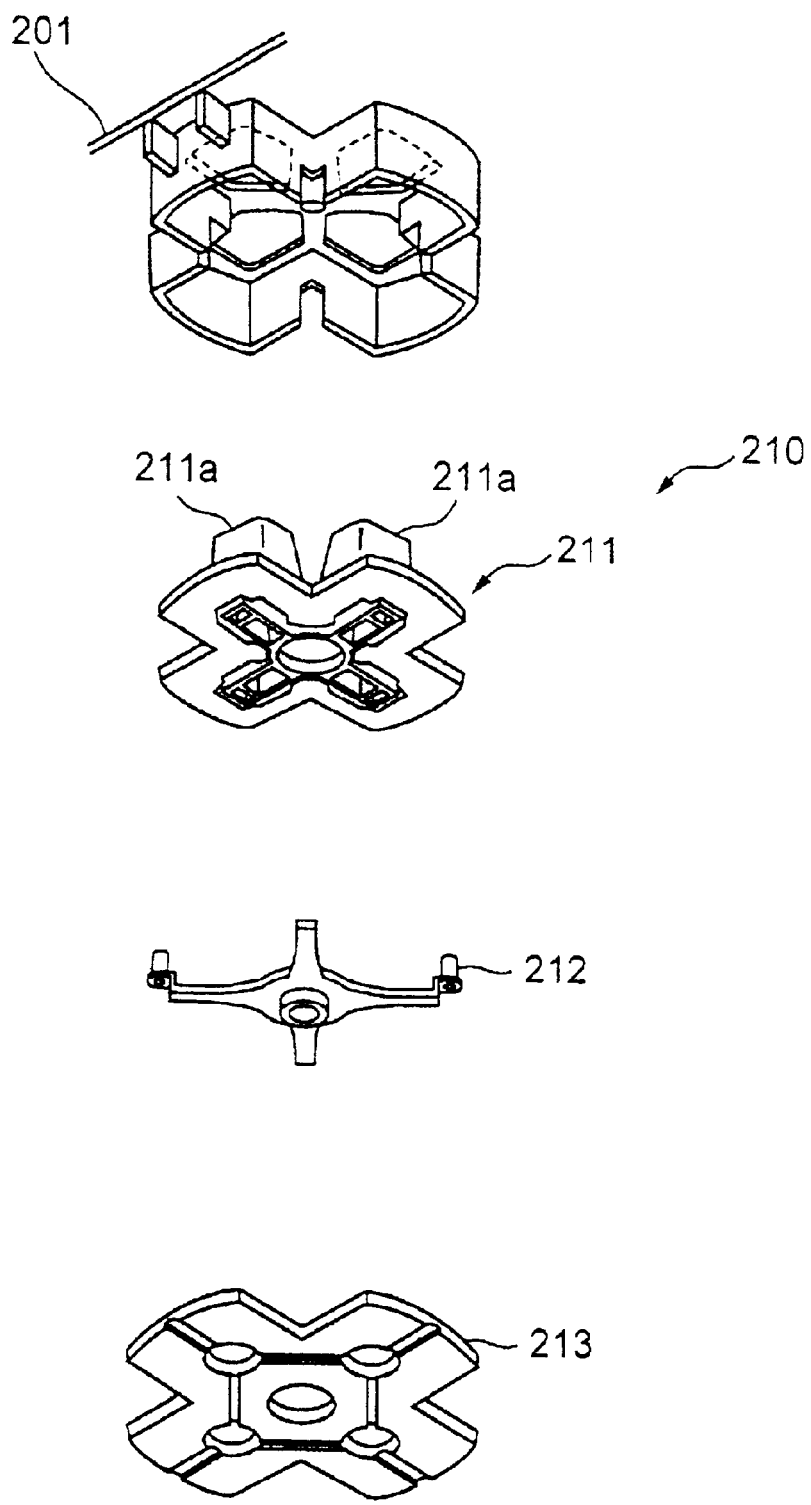
FIG. 12 is an exploded perspective view of an embodiment of the first control part of the controller.
Figure 13:
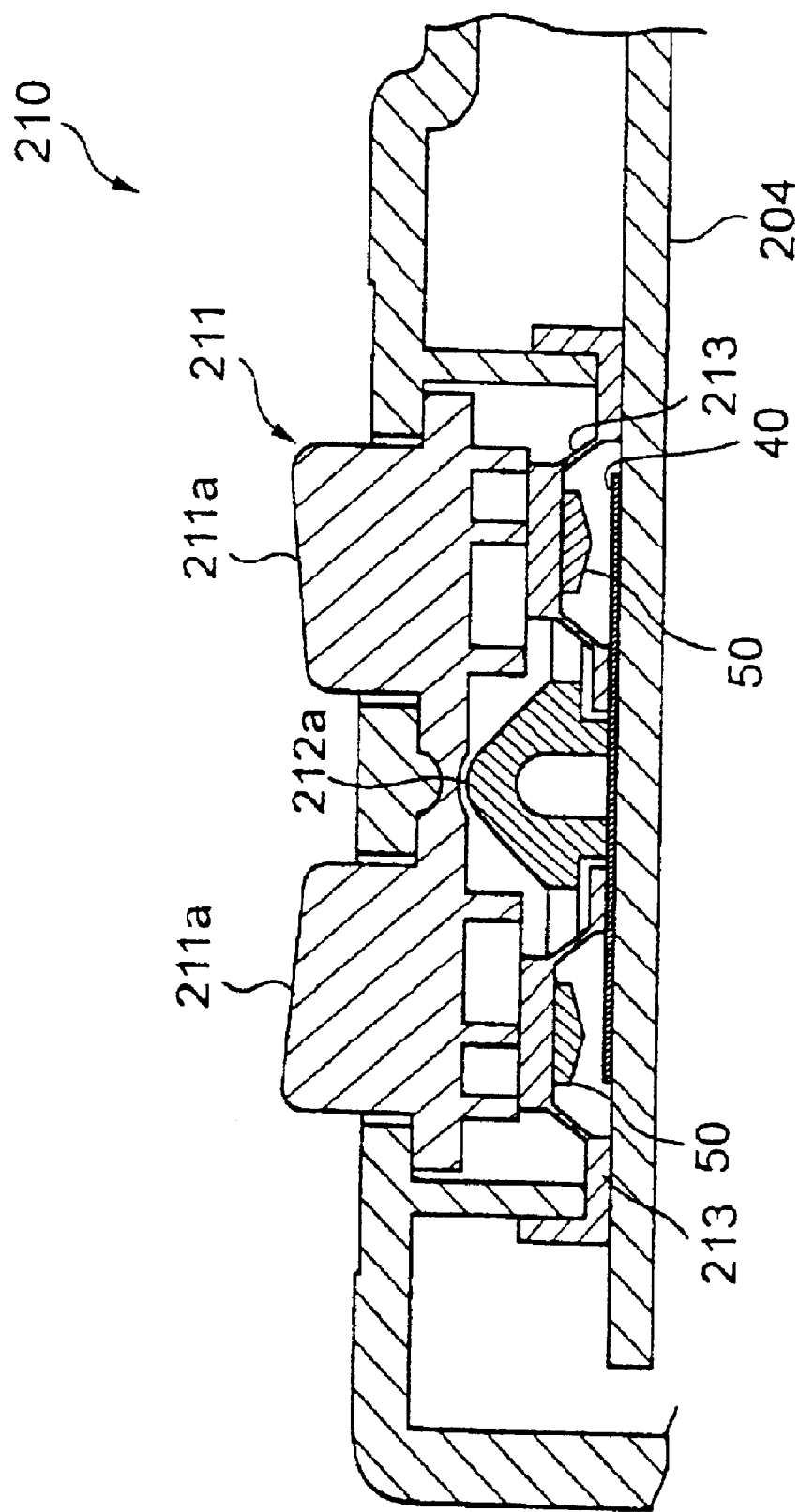
FIG. 13 is a cross sectional view of the first control part of FIG. 12.

FIGS. 12 and 13 show an example of the configuration of the first control part of the controller. As shown in FIG. 12, the first control part 210 includes a cruciform control unit 211, a spacer 212 that positions this control unit 211, and an elastic body 213 that elastically supports the control unit 211. Moreover, as shown in FIG. 12, a conducting member 50 is attached to the rear surface of the elastic body 213, and the configuration is such that resistors 40 are disposed at the positions facing the individual control keys 211a (control elements) of the control unit 211 via the elastic body 213.

The overall structure of the first control part 210 has already been made public knowledge in the publication of unexamined Japanese patent application No. JP-A-H8-163672. The control unit 211 however, uses a hemispherical projection 212a formed in the center of the spacer 212 as a fulcrum, and the individual control keys 211a (control elements) are assembled such that they can push on the resistor 40 side (see FIG. 13).

Conducting members 50 are adhered to the inside of the top surface of the elastic body 213 in positions corresponding to the individual control keys 211a (control elements) of the cruciform control unit 211. In addition, the resistors 40 with a single structure are disposed such that they face the individual conducting members 50.

When the individual control keys 211a which are control elements are pushed, the pushing pressure acts via the elastic body 213 on the pressure-sensitive devices consisting of a conducting member 50 and resistor 40, so that its electrical resistance value varies depending on the magnitude of the pushing pressure.

Figure 14:
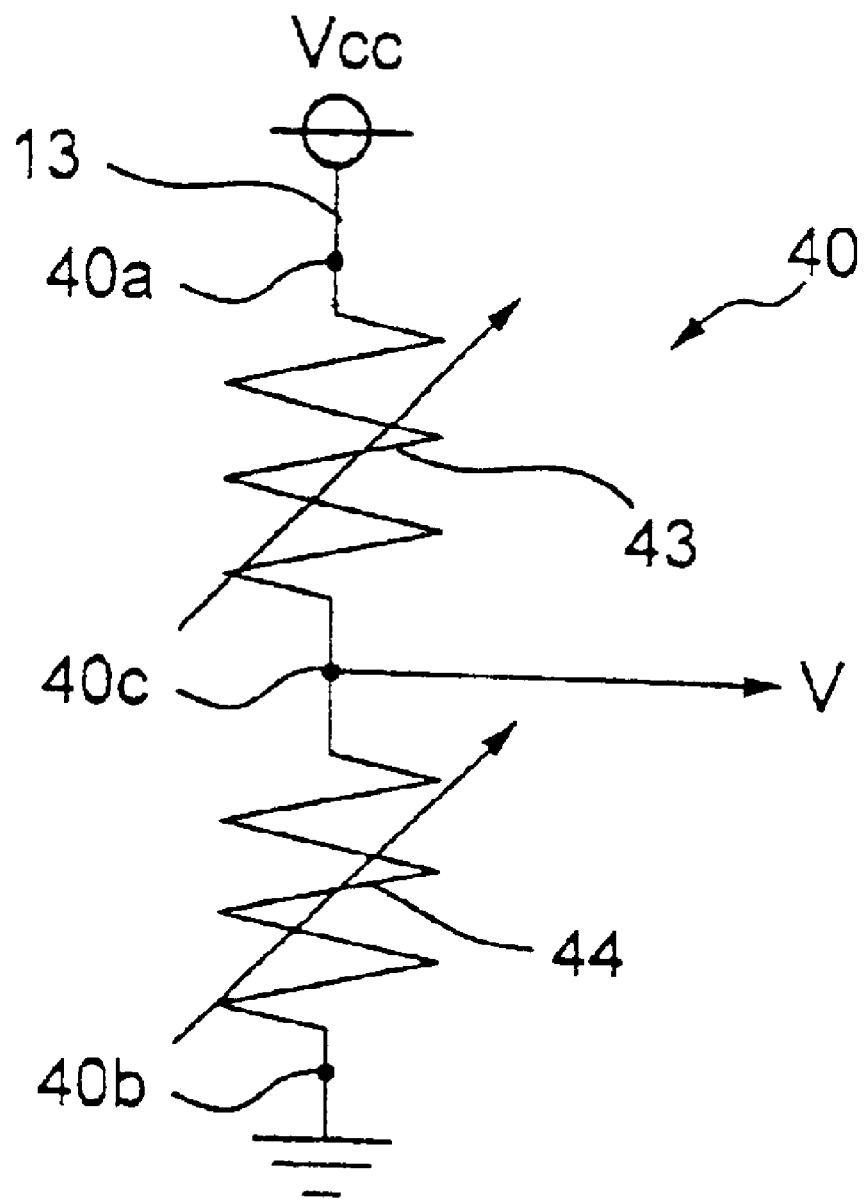
FIG. 14 is a diagram showing the circuit configuration of a resistor.

FIG. 14 is a diagram showing the circuit configuration of the resistor. As shown in this diagram, the resistor 40 is inserted in series in a power supply line 13, where a voltage is applied between the electrodes 40a and 40b. The resistance of this resistor 40 is illustrated schematically, as shown in this diagram; the resistor 40 divided into first and second variable resistors 43 and 44. Among these, the portion of the first variable resistor 43 is in contact, respectively, with the conducting member 50 that moves together with the control key (up directional key) 211a for moving the character in the up direction, and with the conducting member 50 that moves together with the control key (left directional key) 211a for moving the character in the left direction, so its resistance value varies depending on the surface area in contact with these conducting members 50.

In addition, the portion of the second variable resistor 44 is in contact, respectively, with the conducting member 50 that moves together with the control key (down directional key) 211a for moving the character in the down direction, and with the conducting member 50 that moves together with the control key (right directional key) 211a for moving the character in the right direction, so its resistance value varies depending on the surface area in contact with these conducting members 50.

Moreover, an output terminal 40c is provided intermediate between the variable resistors 43 and 44, and an analog signal corresponding to the pushing pressure on the individual control keys 211a (control elements) is provided as output from this output terminal 40c.

The output from the output terminal 40c can be calculated from the ration of the split in resistance value of the first and second variable resistors 43 and 44. For example, if R1 is the resistance value of the first variable resistor 43, R2 is the resistance value of the second variable resistor 44 and $V_{cc}$ is the power supply voltage, then the output voltage V appearing at the output terminal 40c can be expressed by the following equation.

$$V=V_{cc} \times R2/(R1+R2)$$

Therefore, when the resistance value of the first variable resistor 43 decreases, the output voltage increases, but when the resistance value of the second variable resistor 44 decreases, the output voltage also decreases.

Figure 15:
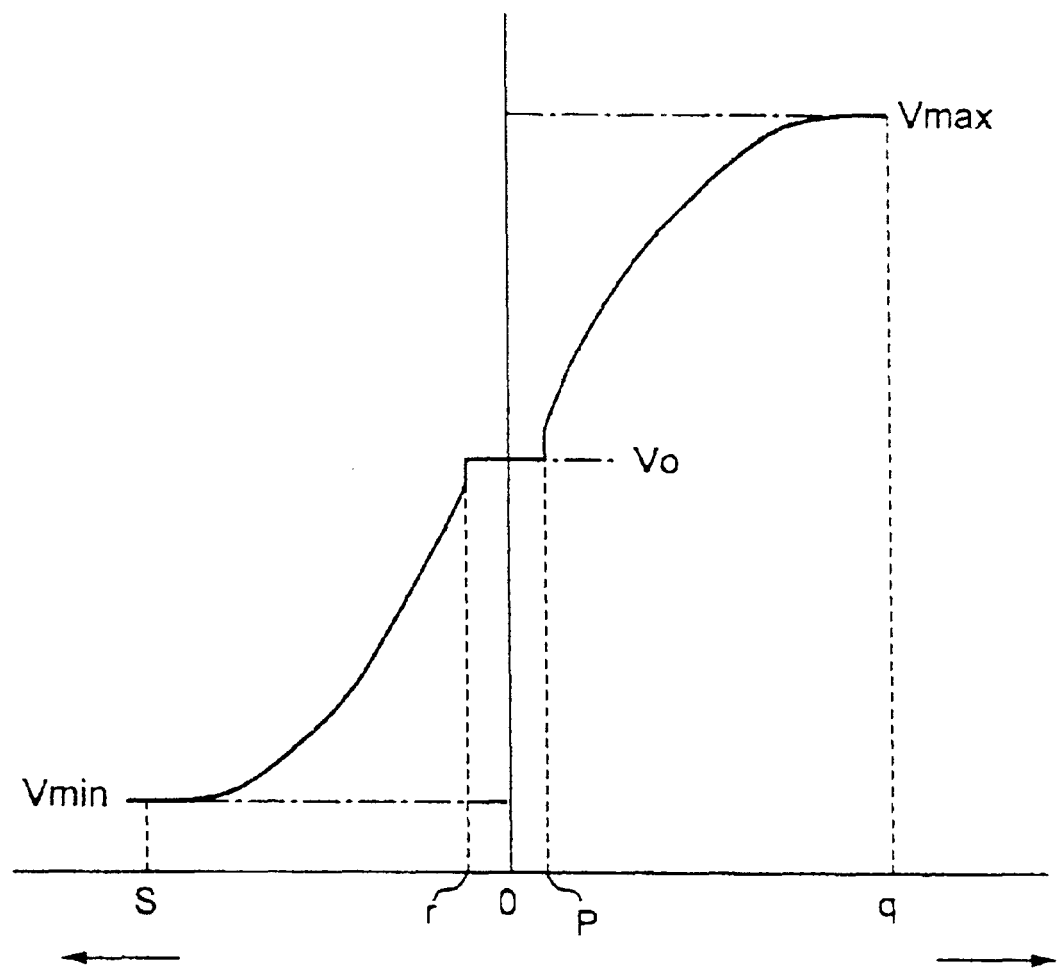
FIG. 15 is a graph showing the characteristics of the signal output.

FIG. 15 is a graph showing the characteristics of the analog signal (voltage) output from the output terminal of the resistor.

First, since a voltage is applied to the resistor 40 when the power is turned on, even if the individual control keys 211a of the control unit 211 are not pressed, a fixed analog signal (voltage) $V_0$ is provided as output from the output terminal 40c (at position 0 in the graph).

Next, even if one of the individual control keys 211a is pressed, the resistance value of this resistor 40 does not change until the conducting member 50 contacts the resistor 40, and the output from the resistor 40 remains unchanged at $V_0$.

Furthermore, if the up-directional key or left-directional key is pushed until the conducting member 50 comes into contact with the first variable resistor 43 portion of the resistor 40 (at position p in the graph), thereafter the surface area of contact between the conducting member 50 and the first variable resistor 43 portion increases in response to the pushing pressure on the control key 211a (control elements), and thus the resistance of that portion is reduced so the analog signal (voltage) output from the output terminal 40c of the resistor 40 increases. Furthermore, the analog signal (voltage) output from the output terminal 40c of the resistor 40 reaches the maximum $V_{max}$ when the conducting member 50 is most deformed (at position q in the graph).

On the other hand, if the down-directional key or right-directional key is pushed until the conducting member 50 comes into contact with the second variable resistor 44 portion of the resistor 40 (at position r in the graph), thereafter the surface area of contact between the conducting member 50 and the second variable resistor 44 portion increases in response to the pushing pressure on the control key 211a (control elements), and thus the resistance of that portion is reduced, and as a result, the analog signal (voltage) output from the output terminal 40c of the resistor 40 decreases. Furthermore, the analog signal (voltage) putout from the output terminal 40c of the resistor 40 reaches the minimum $V_{min}$ when the conducting member 50 is most deformed (at position s in the graph).

Figure 16:
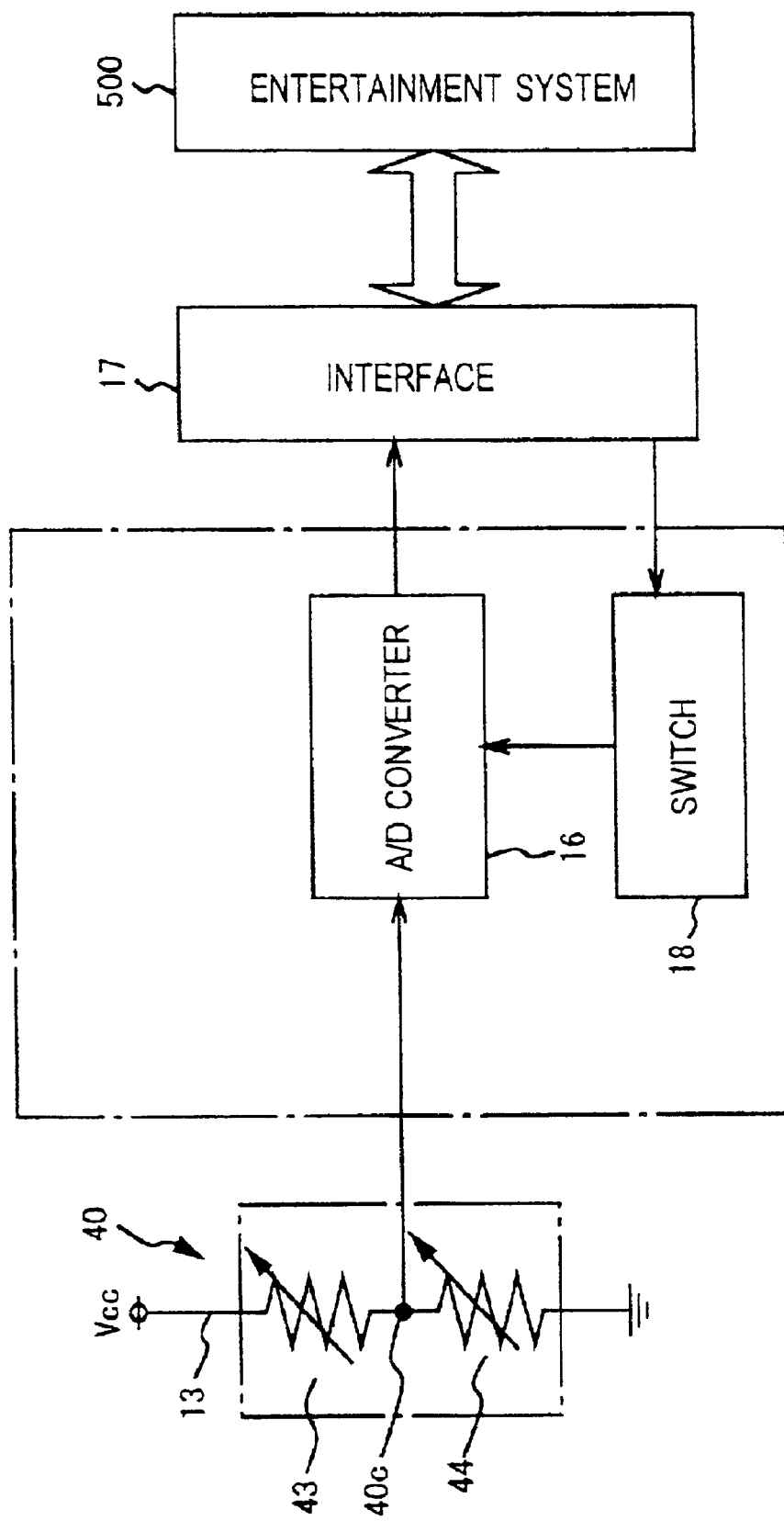
FIG. 16 is a block diagram schematically showing the overall constitution including the resistor.

As shown in FIG. 16, the analog signal (voltage) output from the output terminal 40c of the resistor 40 is provided as input to an A/D converter 16 and converted to a digital signal. It is to be noted that the function of the A/D converter 16 shown in FIG. 16 is as described previously based on FIG. 11, so a detailed description shall be omitted here.

Figure 17:
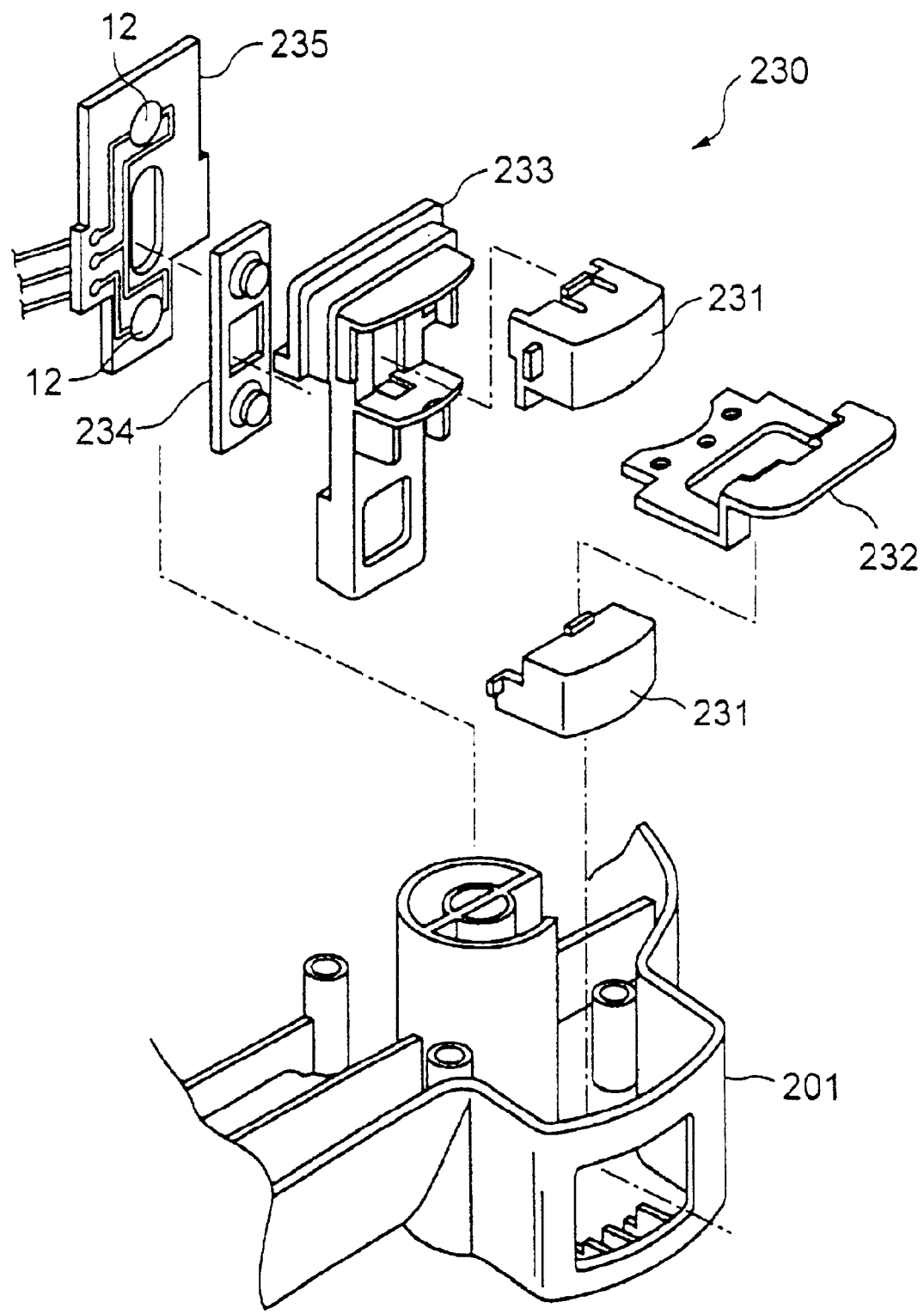
FIG. 17 is an exploded perspective view of an embodiment of the third control part of the controller.

FIG. 17 is an exploded perspective view of the third control part of the controller.

The third control part 230 consists of two control buttons 231, a spacer 232 for positioning these control buttons 231 within the interior of the controller 200, a holder 233 that supports these control buttons 231, an elastic body 234 and an internal board 235, having a structure wherein resistors 40 are attached to appropriate locations upon the internal board 235 and conducting members 50 are attached to the rear surface of the elastic body 234.

The overall structure of the third control part 230 also already has been made public knowledge in the publication of unexamined Japanese patent application No. JP-A-H8-163672, so a detailed description thereof will be omitted. The individual control buttons 231 can be pushed in while being guided by the spacer 232, the pushing pressure when pressed acts via the elastic body 234 on the pressure-sensitive device consisting of a conducting member 50 and resistor 40. The electrical resistance value of the pressure-sensitive device varies depending on the magnitude of the pushing pressure it receives.

It is noted that the fourth control part 240 has the same structure as that od the third control part described above.

FIG. 4 in the above description shows a flowchart for transmitting emotion and volition depending on pressure-sensing values. This program may be supplied either recorded alone upon an optical disc or other recording medium, or recorded upon said recording medium together with the game software as part of the game software. The program for transmitting emotion and volition depending on pressure-sensing values is run by the entertainment system 500 and executed by its CPU.

Here, the meaning of supplying the program transmitting emotion and volition depending on pressure-sense values has the meaning of preparing it in advance as a library for software development. As is common knowledge, at the time of developing software, writing all functions requires an enormous amount of time.

However, if the software functions are divided by the type of function, for example, for moving objects and the like, they can be used commonly by various types of software, so more functions can be included.

To this end, a function such as that described in this preferred embodiment that can be used commonly may be provided to the software manufacturer side as a library program. When general functions like this are supplied as external programs in this manner, it is sufficient for the software manufacturers to write only the essential portions of the software other than the portions of common functions.

While an embodiment was described above the present invention may also assume the following alternative embodiment. In the above described embodiment, the pressure-sensing value as pushed by the user is used as is. However, in order to correct for differences in the body weights of users or differences in how good their reflexes are, it is possible to correct the maximum value of the user pressure-sensing value to the maximum game pressure-sensing value set by the program, and intermediate values may be corrected proportionally and used. This type of correction is performed by preparing a correction table. In addition, the user pressure-sensing value can be corrected based upon a known function. Moreover, the maximum value of the user pressure-sensing value rate of change may be corrected to the maximum game pressure-sensing value rate of change set in the program, and intermediate values can be proportionally corrected and used. For more details about this method, refer to the present inventors' Japanese patent application No. 2000-40257 and the corresponding PCT application JP/(Applicant's file reference No. SC00097).

Due to the present invention, it is possible to provide a user interface for exchanges among characters that is more realistic and easier-to-use than selecting items by pushing a simple ON/OFF switch.

Moreover, by means of the present invention, emotion or volition depending on the pressure-sense values are transmitted, so it is possible to implement an entertainment system with heightened game play and an improved user interface for live simulation games wherein volition had been transmitted by selecting items through pushing buttons by the user.

What is claimed is:

1. A method of executing a game program by using a computer that has a controller which has pressure-sensitive means for sensing a variable pushing pressure of a player on the controller, the method comprising the steps of:

generating a pressure-sensing output signal from said pressure-sensitive means, said pressure-sensing output signal having a variable magnitude dependent on said variable pushing pressure;

examining the pattern in changes of the variable magnitude depending on said variable pushing pressure;

retrieving a table to determine processing to be executed depending on both the pattern of changes in the pressure-sensing value of a pushing pressure of a player on the controller and a scene of the game program that is performed when the controller is operated; and performing said processing to be executed.

2. The method of executing a game program of claim 1, wherein said pattern in changes of the variable magnitude is processed as the degree of emotion or volition of the player.

3. The method of executing a game program of claim 1, wherein said pattern of changes is a combination of gradual changes and rapid changes.

4. The method of executing a game program of claim 1, wherein when said scene is a scene in which the player or the character controlled by the player has a high probability of expressing anger, an emotion of anger is recognized to be present depending on a magnitude of an output value of said controller, and when said scene is a scene in which the player or the character controlled by the player has a high probability of expressing joy, an emotion of joy is recognized to be present depending on the magnitude of the output value of said controller.

5. The method of executing a game program of claim 1, wherein a case where the output value of said controller changes from large to small is recognized to be an emotion of sadness, and a case where the output value of said controller changes from small to large is recognized to be the emotion of joy.

6. The method of executing a program of claim 1, wherein a case where the output value of said controller reaches at least a stipulated level several times in succession is recognized to be an emotion of laughter.

7. The method of executing a game program of claim 1, wherein when a scene is a case were the player or the character controlled by the player is requested to make a decision, if the variable magnitude reaches a highest value that is greater than a stipulated value, then one of a positive response and a negative response is recognized, and if the variable magnitude reaches a highest value that is less than a stipulated value, then the other one of the negative response and the positive response is recognized.

8. A computer readable medium storing a game program including computer executable instructions for execution by a computer that has a controller which has pressure-sensitive means for sensing a variable pushing pressure of a player on the controller, the computer executable instructions performing the steps of:

generating a pressure-sensing output signal from said pressure-sensitive means, said pressure-sensing output signal having a variable magnitude dependent on said variable pushing pressure;

examining the pattern in changes of the variable magnitude depending on said variable pushing pressure;

retrieving a table to determine processing to be executed depending on both the pattern of changes in the pressure-sensing value of a pushing pressure of a player on the controller and a scene of the game program that is performed when the controller is operated; and performing said processing to be executed.

9. The computer readable medium of claim 8, wherein said pattern in changes of the variable magnitude is processed as the degree of emotion or volition of the player.

10. The computer readable medium of claim 8, wherein said pattern of changes is a combination of gradual changes and rapid changes.

11. The computer readable medium of claim 8, wherein when said scene is a scene in which the player or the character controlled by the player has a high probability of expressing anger, an emotion of anger is recognized to be present depending on a magnitude of an output value of said controller, and when said scene is a scene in which the player or the character controlled by the player has a high probability of expressing joy, an emotion of joy is recognized to be present depending on the magnitude of the output value of said controller.

12. The computer readable medium of claim 8, wherein a case where the output value of said controller changes from large to small is recognized to be an emotion of sadness, and a case where the output value of said controller changes from small to large is recognized to be the emotion of joy.

13. The computer readable medium of claim 8, wherein a case where the output value of said controller reaches at least a stipulated level several times in succession is recognized to be an emotion of laughter.

14. The computer readable medium of claim 8, wherein when a scene is a case were the player or the character controlled by the player is requested to make a decision, if the variable magnitude reaches a highest value that is greater than a stipulated value, then one of a positive response and a negative response is recognized, and if the variable magnitude reaches a highest value that is less than a stipulated value, then the other one of the negative response and the positive response is recognized.

15. An apparatus for executing a game program that has a controller which has pressure-sensitive means for sensing a variable pushing pressure of a player on the controller, the apparatus comprising:

means for generating a pressure-sensing output signal from said pressure-sensitive means, said pressure-sensing output signal having a variable magnitude dependent on said variable pushing pressure;

means for examining the pattern in changes of the variable magnitude depending on said variable pushing pressure;

means for retrieving a table to determine processing to be executed depending on both the pattern of changes in the pressure-sensing value of a pushing pressure of a player on the controller and a scene of the game program that is performed when the controller is operated; and means for performing said processing to be executed.

16. The apparatus of claim 15, wherein said pattern in changes of the variable magnitude is processed as the degree of emotion or volition of the player.

17. The apparatus of claim 15, wherein said pattern of changes is a combination of gradual changes and rapid changes.

18. The apparatus of claim 15, wherein when said scene is a scene in which the player or the character controlled by the player has a high probability of expressing anger, an emotion of anger is recognized to be present depending on a magnitude of an output value of said controller, and when said scene is a scene in which the player or the character controlled by the player has a high probability of expressing joy, an emotion of joy is recognized to be present depending on the magnitude of the output value of said controller.

19. The apparatus of claim 15, wherein a case where the output value of said controller changes from large to small is recognized to be an emotion of sadness, and a case where the output value of said controller changes from small to large is recognized to be the emotion of joy.

20. The apparatus of claim 15, wherein a case where the output value of said controller reaches at least a stipulated level several times in succession is recognized to be an emotion of laughter.

21. The apparatus of claim 15, wherein when a scene is a case were the player or the character controlled by the player is requested to make a decision, if the variable magnitude reaches a highest value that is greater than a stipulated value, then one of a positive response and a negative response is recognized, and if the variable magnitude reaches a highest value that is less than a stipulated value, then the other one of the negative response and the positive response is recognized.

* * * * *